(12) United States Patent
Coms et al.

(10) Patent No.: US 9,083,050 B2
(45) Date of Patent: Jul. 14, 2015

(54) CHEMICAL DURABILITY USING SYNERGYSTIC MITIGATION STRATEGIES

(75) Inventors: Frank Coms, Fairport, NY (US); Craig Gittleman, Rochester, NY (US); Annette Brenner, Honeoye Falls, NY (US); Ruichun Jiang, Rochester, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 893 days.

(21) Appl. No.: 12/899,895

(22) Filed: Oct. 7, 2010

(65) Prior Publication Data
US 2012/0088181 A1    Apr. 12, 2012

(51) Int. Cl.
*H01M 8/10* (2006.01)
*H01M 4/92* (2006.01)
*H01M 4/88* (2006.01)
*C08J 5/22* (2006.01)

(52) U.S. Cl.
CPC ............. *H01M 4/881* (2013.01); *C08J 5/2237* (2013.01); *H01M 8/1004* (2013.01); *H01M 8/1051* (2013.01); *H01M 8/1053* (2013.01); *H01M 8/1069* (2013.01); *C08J 2327/18* (2013.01); *H01M 4/92* (2013.01); *Y02E 60/521* (2013.01)

(58) Field of Classification Search
None
See application file for complete search history.

(56) References Cited

U.S. PATENT DOCUMENTS

| 5,766,787 A * | 6/1998 | Watanabe et al. ............. 429/494 |
| 2006/0099475 A1* | 5/2006 | Watanabe et al. ............. 429/33 |
| 2008/0118806 A1* | 5/2008 | Endoh et al. ..................... 429/33 |
| 2008/0166620 A1* | 7/2008 | Fuller et al. ..................... 429/34 |

* cited by examiner

*Primary Examiner* — Maria J Laios
(74) *Attorney, Agent, or Firm* — Brooks Kushman P.C.

(57) ABSTRACT

A fuel cell includes an ion conducting membrane having a first side and a second side. Characteristically, the ion conducting membrane has a sufficient amount of a stabilization agent and platinum to inhibit the loss of fluoride from the ion conducting membrane when compared to an ion conducting membrane having the same construction except for the presence of cerium ions.

7 Claims, 5 Drawing Sheets

CHEMICAL DURABILITY USING SYNERGYSTIC MITIGATION STRATEGIES

TECHNICAL FIELD

The present invention relates to ion conducting membranes for fuel cell applications.

BACKGROUND

Fuel cells are used as an electrical power source in many applications. In particular, fuel cells are proposed for use in automobiles to replace internal combustion engines. A commonly used fuel cell design uses a solid polymer electrolyte ("SPE") membrane or proton exchange membrane ("PEM") to provide ion transport between the anode and cathode.

In proton exchange membrane type fuel cells, hydrogen is supplied to the anode as fuel and oxygen is supplied to the cathode as the oxidant. The oxygen can either be in pure form ($O_2$) or air (a mixture of $O_2$ and $N_2$). PEM fuel cells typically have a membrane electrode assembly ("MEA") in which a solid polymer membrane has an anode catalyst on one face, and a cathode catalyst on the opposite face. The anode and cathode layers of a typical PEM fuel cell are formed of porous conductive materials, such as woven graphite, graphitized sheets, or carbon paper to enable the fuel to disperse over the surface of the catalyst layer facing the fuel supply electrode. Each electrode has finely divided catalyst particles (for example, platinum particles), supported on carbon particles, to promote oxidation of hydrogen at the anode and reduction of oxygen at the cathode. Protons flow from the anode through the ion conductive polymer membrane to the cathode where they combine with oxygen to form water which is discharged from the cell. Typically, the ion conductive polymer membrane includes a perfluorinated sulfonic acid (PFSA) ionomer.

The MEA is sandwiched between a pair of porous gas diffusion layers ("GDL"), which in turn are sandwiched between a pair of non-porous, electrically conductive elements or plates. The plates function as current collectors for the anode and the cathode, and contain appropriate channels and openings formed therein for distributing the fuel cell's gaseous reactants over the surface of respective anode and cathode catalysts. In order to produce electricity efficiently, the polymer electrolyte membrane of a PEM fuel cell must be thin, chemically stable, proton transmissive, non-electrically conductive and gas impermeable. In typical applications, fuel cells are provided in arrays of many individual fuel cell stacks in order to provide high levels of electrical power.

One mechanism by which ion conducting polymer membranes degrade is via loss of fluorine (i.e., fluoride emission) under open circuit voltage (OCV) and dry operating conditions at elevated temperatures. Additives to PFSA membranes are required to improve fuel cell life, increase membrane durability and reduce fluoride emissions under these conditions.

Accordingly, there is a need for improved ion conducting membranes with reduced fluoride emissions.

SUMMARY OF THE INVENTION

The present invention solves one or more problems of the prior art by providing in at least one embodiment, a membrane electrode assembly for fuel cells having improved stability. The membrane electrode assembly includes an anode, a cathode, and an ion conducting membrane interposed between the anode and cathode. Characteristically, the ion conducting membrane includes an ion conducting polymer having cerium ions and platinum metal dispersed within at least a portion of the ion conducting membrane. Advantageously, the combination of cerium ions and platinum in the ion conducting membrane exhibits greater chemical stability than when either additive is used alone.

BRIEF DESCRIPTION OF THE DRAWINGS

Exemplary embodiments of the present invention will become more fully understood from the detailed description and the accompanying drawings, wherein.

DETAILED DESCRIPTION OF EXEMPLARY EMBODIMENTS

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

Throughout this application, where publications are referenced, the disclosures of these publications in their entireties are hereby incorporated by reference into this application to more fully describe the state of the art to which this invention pertains.

Figure 1:
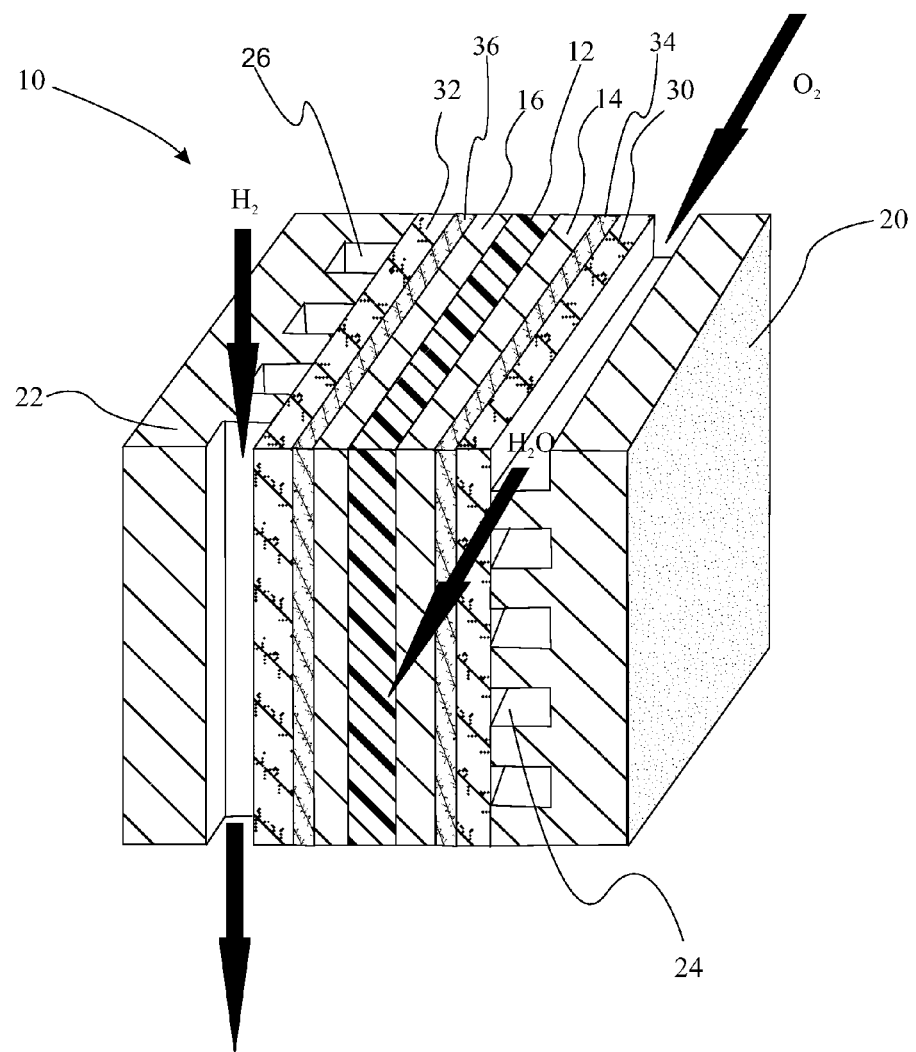
FIG. 1 is a schematic illustration of a fuel cell that incorporates an ion conducting membrane of one or more embodiments of the invention.

With reference to FIG. 1, a fuel cell that incorporates a membrane electrode assembly of an embodiment of the present invention is provided. PEM fuel cell 10 includes polymeric ion conductive membrane 12 disposed between first catalyst layer 14 and second catalyst layer 16. In a variation, first catalyst layer 14 is a cathode layer and second catalyst layer 16 is an anode layer. In some variations, polymeric ion conductive layer 12 includes a perfluorosulfonic acid ("PFSA") polymer. Collectively, polymeric ion conductive membrane 12, cathode catalyst layer 14, and anode catalyst layer 16 define a membrane electrode assembly ("MEA"). An ion conductive membrane includes an effective amount of a stabilization agent (e.g., cerium ions) and platinum to inhibit the loss of fluoride from the ion conducting membrane. In a variation, the ion conducting membrane includes a first ion conducting membrane proximate to the anode and a second ion conducting membrane proximate to the cathode. In a refinement, the concentration of platinum in the second ion conducting membrane is higher than the amount of platinum in the first ion conducting membrane.

Fuel cell 10 also includes electrically conductive plates 20, 22 and gas channels 24, 26. Gas diffusion layer 30 is interposed between electrically conductive plate 20 and first catalyst layer 14, and gas diffusion layer 32 is interposed between electrically conductive plate 22 and second catalyst layer 16. Optionally, gas diffusion layer 30 includes microporous layer 34 and gas diffusion layer 32 includes microporous layer 36.

Figure 2:
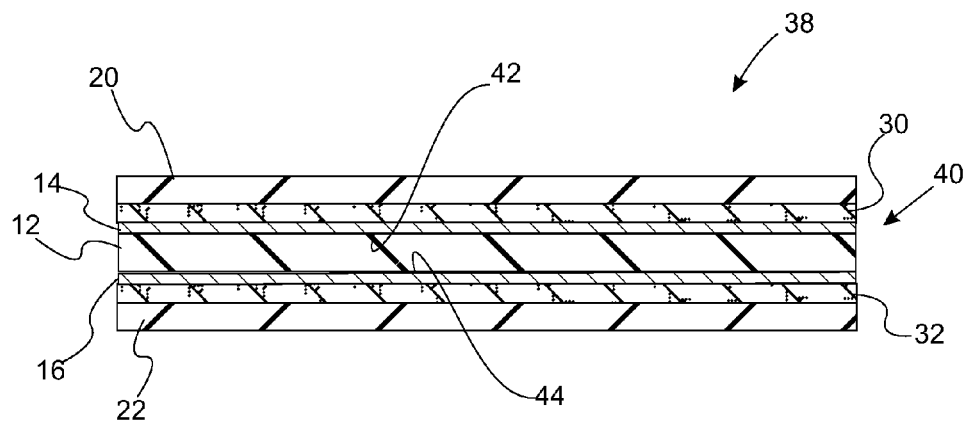
FIG. 2 is a schematic cross section of a membrane electrode assembly exhibiting improved fluoride retention.

With reference to FIG. 2, an illustration of a fuel cell with improved fluoride retention is provided. FIG. 2 is a schematic cross section of a fuel cell in which the catalyst layers are applied to an ion conducting membrane. In the variation of FIG. 2, fuel cell 38 includes membrane electrode assembly 40. Membrane electrode assembly 40 includes ion conductive membrane 12 having first side 42 and second side 44. As set forth above, the ion conductive membrane 12 includes an effective amount of a stabilization agent (e.g., cerium ions) and platinum or a platinum-containing compound or alloy to inhibit the loss of fluoride from the ion conductive membrane. In a refinement, the stabilization agent and platinum are in a sufficient amount to reduce the fluoride release rates under open circuit conditions at various relative humidities (RH) to a level less than or equal to $1\times10^{-6}$ gF/(cm$^2$·h). In particular, the following combinations were used: 95° C./50% RH, 95° C./25% RH, and 110° C./25% RH. The greatest contrast in FRR is found at 110° C./25% RH as set forth in FIG. 4. In another refinement, the stabilization agent and platinum are in a sufficient amount to reduce the fluoride release rates under open circuit conditions at 110° C. and 25% relative humidity to a level from about $1\times10^{-5}$ gF/(cm$^2$·h) to about $1\times10^{-6}$ (gF/cm$^2$·h). First catalyst layer 14 is applied or adhered to first side 42 of ion conductive membrane 12. Second catalyst layer 16 is applied or adhered to second side 44 of the ion conducting membrane.

In a variation of the present embodiment, the fuel cells set forth above are characterized by a fluoride release rate under open circuit conditions at 95° C. and 50% relative humidity that is less than about $1\times10^{-7}$ gF/(cm$^2$·h). In another variation, the fuel cells are characterized by fluoride release rates under open circuit conditions at 95° C. and 50% relative humidity which are from about $1\times10^{-6}$ (gF/cm$^2$·h) to about $1\times10^{-5}$ gF/(cm$^2$·h). In yet another variation, the fuels cells set forth above are characterized by SO$_3$H exchange levels (percent of ionomer sulfonate groups in the ion conductive membrane complexed by Ce$^{3+}$) that are from about 0.1% to about 10 mol %. In still another variation, the fuels cells set forth above are characterized by SO$_3$H exchange levels that are from about 1% to about 5 mol %. In still another variation, the fuels cells set forth above are characterized by SO$_3$H exchange levels that are from about 2% to about 4 mol %.

Figure 3:
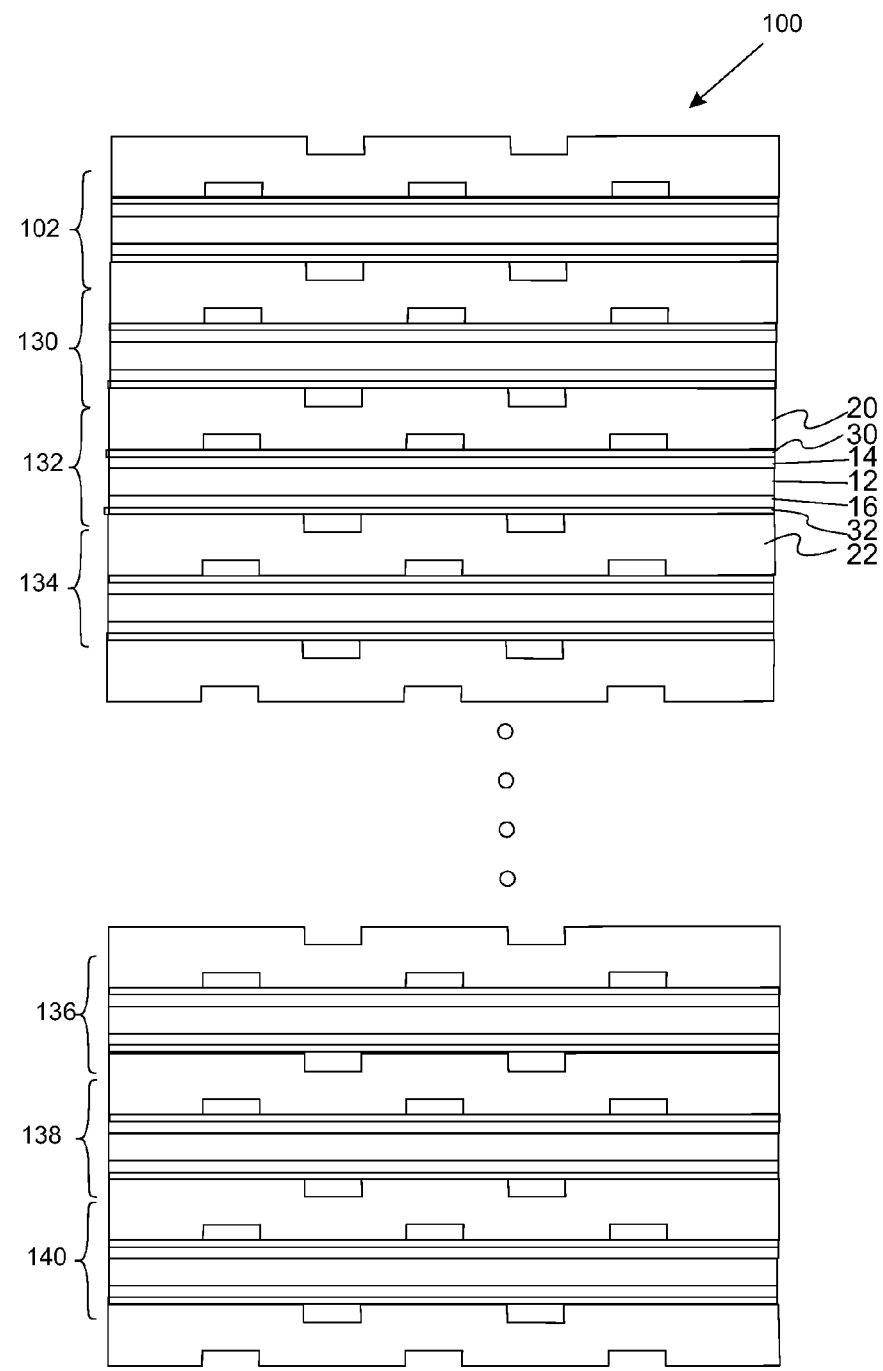
FIG. 3 is a schematic illustration of a fuel cell stack incorporating the fuel cell of FIG. 1.

With reference to FIG. 3, a schematic illustration of a fuel cell stack incorporating the fuel cells of FIGS. 1 and 2 is provided. Fuel cell stack 100 includes a plurality of fuel cells 102-140 stacked together. Each of the fuel cells is of the general design set forth above with respect to FIGS. 1 and 2. In a refinement, the fuels cells (and MEAs) of FIGS. 1 and 2 when incorporated in a fuel cell stack exhibit less degradation (e.g., average voltage decay rate) than a similar (i.e., same design) fuels incorporating membrane electrode assemblies without the stabilizing agent (e.g., cerium).

In another embodiment, a method of making a fuel cell as set forth above is provided. The method of this embodiment includes a step of forming an ion conducting membrane containing a stabilizing agent and platinum or a platinum-containing compound or alloy. In one refinement, the ion conducting membrane includes platinum particles, and in particular nanoparticles supported on carbon to form a first ion conducting membrane combination. A first catalyst layer is then placed over a first side of the ion conducting membrane such that the first catalyst layer contacts a portion of the ion conducting membrane. Characteristically, the first catalyst layer includes a stabilization agent (e.g., cerium ions) that is diffusible into the ion conducting membrane. A second catalyst layer is then placed over a second side of the ion conducting membrane. The second side is opposite to the first side. In a variation, the second catalyst layer also includes a stabilization agent (e.g., cerium ions) that is diffusible into the ion conducting membrane. In a refinement, the stabilization agent is present in an amount of about 0.01 weight percent to about 5 weight percent of the weight of the catalyst layer (i.e., first catalyst layer or second catalyst layer) in which it is included. In another refinement, the stabilization agent is present in an amount of about 0.05 weight percent to about 6 weight percent of the weight of the catalyst layer (i.e., first catalyst layer or second catalyst layer) in which it is included. In yet another refinement, the stabilization agent is present in an amount of about 0.1 weight percent to about 5 weight percent of the weight of the catalyst layer (i.e., first catalyst layer or second catalyst layer) in which it is included. In still another refinement, the stabilization agent is present in an amount of about 0.2 weight percent to about 4 weight percent of the weight of the catalyst layer (i.e., first catalyst layer or second catalyst layer) in which it is included. The amount of stabilization agent corresponding to these amounts is typically from the ion conducting membrane that has a cerium ion coverage from about 0.05 μg/cm$^2$ to about 100 μg/cm$^2$. In a refinement, the amount of stabilization agent in the ion conducting membrane is from about 0.1 μg/cm² to about 20 μg/cm². In a refinement, the amount of stabilization agent in the ion conducting membrane is from about 0.5 μg/cm² to about 10 μg/cm². Optional gas diffusion layers may be placed over the first and second catalyst layers. The fuel cell is completed by placement of the electrically conductive plates on each side.

In the variation embodiments and variations set forth above, the stabilization agent comprises cerium ions and in particular $Ce^{3+}$ ions. The stabilization agent is not platinum which is included separately in the present invention. In another variation, the stabilization agent includes a compound selected from the group consisting of $CeO_2$, $MnO_2$, Ce(III) containing compounds, Ce(IV) containing compounds, Mn(II) containing compounds, Mn(IV) containing compounds, and combinations thereof. In still another variation, the stabilization agent comprises a compound selected from the group consisting of $CeO_2$ nanoparticles, $MnO_2$ nanoparticles, and combinations thereof.

As set forth above, the fuel cell of the present embodiment includes a first and a second catalyst layer. Typically, the first catalyst layer and the second catalyst layer each independently include a precious metal. In a variation, the first catalyst layer and the second catalyst layer each independently include a catalyst support. In a further refinement, the first catalyst layer and the second catalyst layer each independently include a catalyst in an amount from about 0.01 mg/cm² to about 0.8 mg/cm². In a further refinement, the ion conducting layer includes a catalyst (e.g., Pt) with a coverage in an amount from about 1 μg/cm² to about 30 μg/cm². Preferred catalysts include metals, but are not limited to, platinum (Pt), palladium (Pd); and mixtures of metals Pt and molybdenum (Mo), Pt and cobalt (Co), Pt and ruthenium (Ru), Pt and nickel (Ni), and Pt and tin (Sn). Typically, such catalysts are impregnated onto a support such as carbon or various metal-oxides. In another variation, the first catalyst layer and the second catalyst layer each independently include a stabilization agent (e.g., cerium ions). In a refinement, the stabilization agent (e.g., cerium ions) is diffusible into the ion conducting membrane.

The following examples illustrate the various embodiments of the present invention. Those skilled in the art will recognize many variations that are within the spirit of the present invention and scope of the claims.

Catalyst Ink Preparation

To 55.5 g of a magnetically stirred ethanol/water solution of perfluorosulfonic acid ionomer (28% solids, 15.5 g ionomer, EW=910 g/mol, 17.1 mmol $SO_3H$) is added 172 mg of $Ce_2(CO_3)_3 \cdot 8H_2O$ (0.57 mmol $Ce^{3+}$). Carbon dioxide evolution occurs as the temperature of the solution is raised to 40° C. for one hour and then allowed to stir overnight. The ionomer solution is added to 34.2 g of a catalyst powder in which Pt (45.6 wt. %) is supported on a carbon nanoparticle carrier (ionomer/carbon=0.84). The resulting mixture is milled for 72 hours to prepare the catalyst ink for coating. The catalyst ink is coated on an ePTFE decal using a coating bar and dried at 80° C. for five minutes. The large catalyst decal is die cut to 50 cm² decals for membrane electrode assembly. Using this ink making procedure, the catalyst decal contains 0.1 mg (0.7 μmol) $Ce^{3+}$ (this results in about 1 μg/cm² in the membrane). Unmitigated decals are prepared using a virtually identical procedure which omits the addition of the cerium salt.

MEA Preparation

The PFSA membranes employed were three layer structures possessing two ionomer layers and a central reinforcing layer of expanded PTFE into which ionomer is imbibed. Each of the layers is approximately 6 μm thick giving a total composite thickness of 18 μm. In the platinum containing membranes, one of the ionomer layers contains uniformly distributed platinum nanoparticles supported on carbon. The loading of platinum containing membranes is 0.015 mg/cm². Unsubgasketed membrane electrode assemblies (MEAs) are prepared by hot pressing two 50 cm² catalyst decals to a 100 cm² membrane for four minutes under a force of 4000 pounds (300 psi). Cerium containing decals can be applied to either side of the Pt containing membranes. Based on mass of catalyst transferred, the nominal Pt coverage on the cathode is determined to be 0.4 mg/cm².

Chemical Durability Testing

Figure 4:
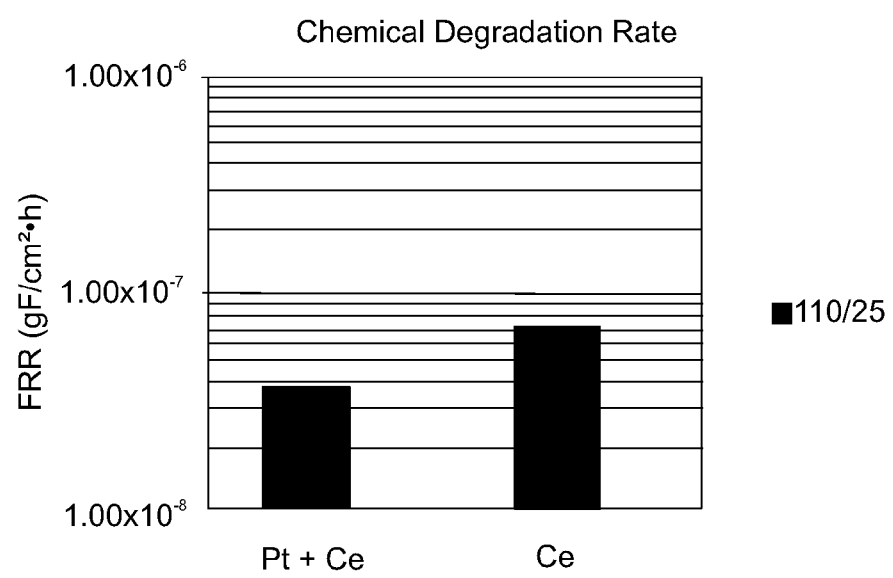
FIG. 4 provides a bar chart showing the fluoride release rates (FRR) expressed as $gF/(cm^2 \cdot h)$ at 110° C. and 25% Relative Humidity (RH) for fuels cells with cerium in the ion conducting membrane and with both platinum/cerium in the ion conducting membrane.

For Pt containing MEAs, cells are assembled with the Pt ionomer of the MEA toward the cathode. Membrane electrode assembly chemical durability is evaluated by monitoring fluoride release rates (FRR) during operation under open circuit conditions at 110° C. and 25% relative humidity for both anode and cathode. FIG. 4 provides a bar chart showing the fluoride release rates (FRR) for fuels cells at 110° C. and 25% Relative Humidity (RH) with cerium in the ion conducting membrane and with both platinum/cerium in the ion conducting membrane.

Fluoride release rates of membrane electrode assemblies of the present invention (Pt plus cerium) are evaluated in comparison with MEAs prepared without Pt in the membrane ionomer with cerium (no Pt and cerium).

Figure 5:
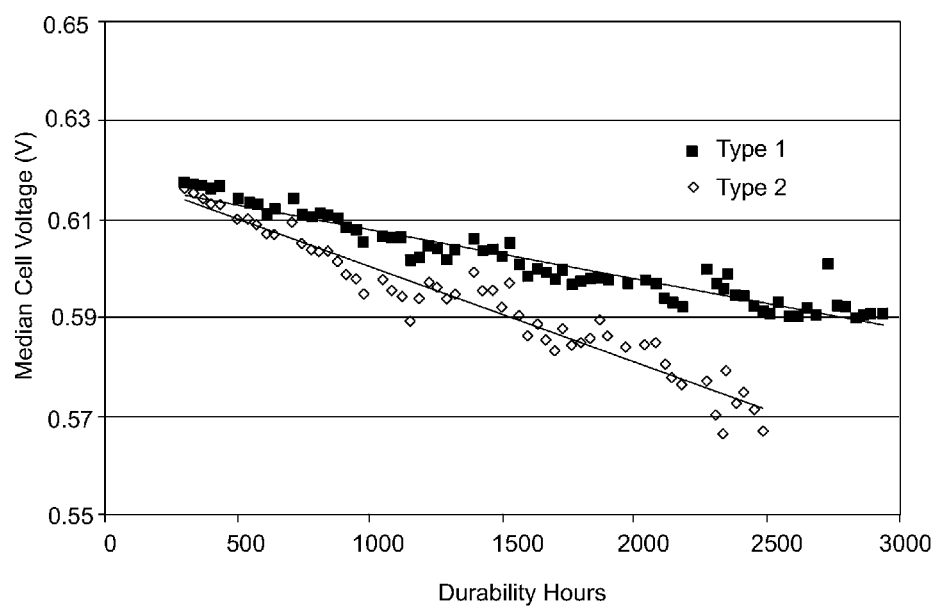
FIG. 5 demonstrates short stack durability by providing plots of the cell voltage versus time for membranes containing cerium with and without platinum; Type 1 is a membrane with Pt=15 $\mu g/cm^2$, Ce=1.5 $\mu g/cm^2$, and observed degradation rate=−9.9 $\mu V/hr$; Type 2 is a membrane with Pt=0 $\mu g/cm^2$, Ce=1.5 $\mu g/cm^2$, and observed degradation rate=−19.2 $\mu V/hr$.

Additional advantages of the combination of cerium ions and platinum within the ion conducting membrane is further exemplified by fuel cell durability observed in stacks. The membrane and electrode durabilities of MEAs within stacks are determined by subjecting the cells to hundreds of hours of current density (voltage) and humidity cycling. The electrode durability is assessed by running periodic polarization curves and monitoring the change in voltage at various current densities over time. FIG. 5 displays the voltage decay traces recorded at a current density of 1.5 A/cm² for two types of MEAs (labeled Type 1 and Type 2) within a common stack. The data in this figure provides the voltage at 1.5 A/cm² obtained during periodic diagnostic polarization curves (80° C., 85% RH out) that are inserted into the durability cycles. The durability cycles consist of repeated current density (voltage) and humidity cycles. The protocol consists of about 30 voltage cycles and three humidity cycles per hour of run time run at a nominal temperature of 80° C. Significantly, the durability testing does not consist of a steady state run at 1.5 A/cm². Both types of MEAs are 18 μm thick and contain 1.5 μg/cm² of cerium within the respective membranes. Type 1 MEAs contain 15 μg/cm² of platinum supported on carbon within the membrane while the Type 2 MEAs contain no platinum. As shown in FIG. 5, the Type 1 MEAs have an average voltage decay rate of 9.9 μV/hr while the Type 2 MEAs exhibit a decay rate of 19.2 μV/hr. Thus, the combination of cerium and platinum within a membrane provides a significant improvement in electrode life relative to the presence of an equivalent amount of cerium alone.

The combination of cerium and platinum also provides a dramatic improvement in membrane lifetime. Membranes fail when they no longer provide an effective barrier against gas crossover or electric current. Such failures are associated with significant loss of the membrane ionomer that accompanies high levels of chemical degradation. For the stack shown in FIG. 5, no membrane failures were observed in the Type 1 MEAs through 4500 hrs of testing while 75% of the Type 2 MEAs failed due to extensive ionomer loss. Thus, the combination of cerium and platinum within a membrane greatly arrests chemical degradation, thereby providing a significant improvement in membrane life relative to the presence of an equivalent amount of cerium alone.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of making a membrane electrode assembly, the method comprising:
   a) placing a cathode layer over a first side of an ion conducting membrane such that the cathode layer contacts a portion of the ion conducting membrane, the cathode layer including a stabilization agent that is diffusible into the ion conducting membrane and the ion conducting membrane includes platinum or a platinum-containing compound or alloy; the stabilization agent comprising a compound selected from the group consisting of Ce(III) containing compounds, Mn(II) containing compounds, and combinations thereof; and
   b) placing an anode layer over a second side of the ion conducting membrane wherein the ion conducting membrane comprises a first ion conducting membrane proximate to the anode and a second ion conducting membrane proximate to the cathode, a concentration of platinum in the second ion conducting membrane being higher than a concentration of platinum in the first ion conducting membrane.

2. The method of claim 1 wherein the anode layer independently includes the stabilization agent.

3. The method of claim 1 wherein the ion conducting membrane includes platinum particles.

4. The method of claim 1 wherein the ion conducting membrane include platinum nanoparticles.

5. The method of claim 1 wherein the ion conducting membrane has a platinum coverage from about 1 μg/cm$^2$ to about 30 μg/cm$^2$.

6. The method of claim 1 wherein the ion conducting membrane has a cerium ion coverage from about 0.05 μm/cm$^2$ to about 100 μg/cm$^2$.

7. The method of claim 1 wherein the ion conducting membrane includes a perfluorinated sulfonic acid polymer.

* * * * *